United States Patent
Stump et al.

(10) Patent No.: US 9,038,382 B2
(45) Date of Patent: May 26, 2015

(54) TURBOCHARGER ARRANGEMENT FOR AN INTERNAL COMBUSTION ENGINE

(71) Applicant: Ford Global Technologies, LLC, Dearborn, MI (US)

(72) Inventors: Ludwig Stump, Cologne (DE); Bernd Schumacher, Langenfeld (DE); Marco Marceno, Hagen (DE); Jan Linsel, Cologne (DE); Kay Hohenboeken, Cologne (DE); Oliver Berkemeier, Bergisch Gladbach (DE); Jens Wojahn, Bergisch Gladbach (DE); Klemens Grieser, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/867,969

(22) Filed: Apr. 22, 2013

(65) Prior Publication Data

US 2013/0280032 A1    Oct. 24, 2013

(30) Foreign Application Priority Data

Apr. 23, 2012    (DE) .................. 10 2012 206 650

(51) Int. Cl.
F02B 33/44        (2006.01)
F04B 17/00        (2006.01)
F01D 25/18        (2006.01)
F02C 6/12         (2006.01)

(52) U.S. Cl.
CPC . *F01D 25/18* (2013.01); *F02C 6/12* (2013.01); *F05D 2220/40* (2013.01)

(58) Field of Classification Search
CPC .............................. F01D 25/18; F01D 25/125
USPC ................. 60/605.3; 417/407; 184/6.11, 6.16
See application file for complete search history.

(56) References Cited

U.S. PATENT DOCUMENTS

| | | | | |
|---|---|---|---|---|
| 2,973,136 | A * | 2/1961 | Greenwald | 417/407 |
| 4,009,972 | A * | 3/1977 | Sarle | 417/407 |
| 4,142,608 | A * | 3/1979 | Sarle | 184/6.11 |
| 4,376,617 | A * | 3/1983 | Okano et al. | 417/407 |
| 4,444,014 | A * | 4/1984 | Kobayashi et al. | 60/608 |
| 4,478,043 | A * | 10/1984 | Kobayashi et al. | 60/608 |
| 4,599,862 | A * | 7/1986 | Bergeron | 60/605.3 |
| 4,752,193 | A * | 6/1988 | Horler | 184/6.11 |
| 7,946,118 | B2 * | 5/2011 | Hippen et al. | 60/605.3 |
| 8,347,865 | B2 | 1/2013 | Valencia et al. | |
| 8,651,833 | B2 * | 2/2014 | Heaps et al. | 417/410.3 |
| 2010/0000207 | A1 * | 1/2010 | Heaps et al. | 60/327 |
| 2010/0139270 | A1 | 6/2010 | Koch et al. | |

FOREIGN PATENT DOCUMENTS

WO      2008155267 A1    12/2008

* cited by examiner

*Primary Examiner* — Audrey K Bradley
*Assistant Examiner* — Ngoc T Nguyen
(74) *Attorney, Agent, or Firm* — Julia Voutyras; Alleman Hall McCoy Russell & Tuttle LLP

(57) ABSTRACT

A turbocharger arrangement in an internal combustion engine is provided. The turbocharger arrangement includes a turbocharger housing surrounding a sealed inner space and a shaft extending through the turbocharger housing. The turbocharger arrangement further includes a turbine wheel arranged on the shaft and driving a compressor unit, a bearing arrangement mounting the shaft in the turbocharger housing, an oil supply device lubricating the bearing arrangement, and a pressure changing unit in fluidic communication with the sealed inner space configured to adjust the pressure in the sealed inner space based on engine operating conditions.

13 Claims, 3 Drawing Sheets

TURBOCHARGER ARRANGEMENT FOR AN INTERNAL COMBUSTION ENGINE

CROSS REFERENCE TO RELATED APPLICATIONS

The present application claims priority to German Patent Application No. 102012206650.0, filed on Apr. 23, 2012, the entire contents of which are hereby incorporated by reference for all purposes.

FIELD

The invention relates to a turbocharger arrangement for an internal combustion engine and a method for operation of a turbocharger arrangement.

BACKGROUND AND SUMMARY

Internal combustion engines, in particular diesel and gasoline engines, are increasingly provided with turbocharger arrangements. The turbocharger arrangement serves for compressing the charge air fed to the internal combustion engine, with the result that an increase in power can be brought about. Conversely, a stipulated power can be achieved by a supercharged engine with a lower cubic capacity, as a result of which a smaller and lighter version and a drive having lower fuel consumption can be obtained. Turbochargers of this type are usually driven by the exhaust gas stream of the internal combustion engine, for which purpose the turbocharger arrangement has a turbine wheel which is arranged in the exhaust gas stream. The turbine wheel may drive via a common shaft a compressor unit which compresses the charge air of the engine. Both the turbine wheel and the compressor unit may adjoin the turbocharger housing on the outside, so that a compressor-side and a turbine wheel-side end of the turbocharger housing or of the inner space can be defined.

A sealing system may be provided in the turbocharger to seal a turbine shaft and lubricated components from the turbine and compressor wheels. However, during some operating conditions oil may leak from the lubricated components into the compressor and/or turbine sides of the turbocharger. Oil that escapes on the compressor-side end contaminates the charge air, thereby leading to undesirable effects during combustion. Some of these undesirable effects are, for example, what are known as "megaknocks" or incomplete combustion. The particle emissions consequently rise, and it therefore becomes difficult to fulfill emission regulations. If oil escapes on the turbine wheel side, it may settle on downstream particle filters and catalysts, with the result that the functioning capacity of these is restricted, this likewise having an adverse effect upon emissions. US 2010/0139270 discloses a sealing system configured to seal lubricated components from the compressor and turbine wheels. However, the disadvantages described above with regard to the sealing system may be experienced in the sealing system described in US 2010/0139270.

To address at least some of the disadvantages discussed above, a turbocharger arrangement in an internal combustion engine is provided. The turbocharger arrangement includes a turbocharger housing surrounding a sealed inner space and a shaft extending through the turbocharger housing. The turbocharger arrangement further includes a turbine wheel arranged on the shaft and driving a compressor unit, a bearing arrangement mounting the shaft in the turbocharger housing, an oil supply device lubricating the bearing arrangement, and a pressure changing unit in fluidic communication with the sealed inner space configured to adjust the pressure in the sealed inner space based on engine operating conditions.

In this way, the pressure in the inner space may be adjusted to reduce the pressure different between the inner space and the compressor and/or turbine sides in the turbocharger. As a result, the likelihood of oil leakage into the compressor and/or turbine wheels is reduced, thereby improving combustion operation and reducing emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
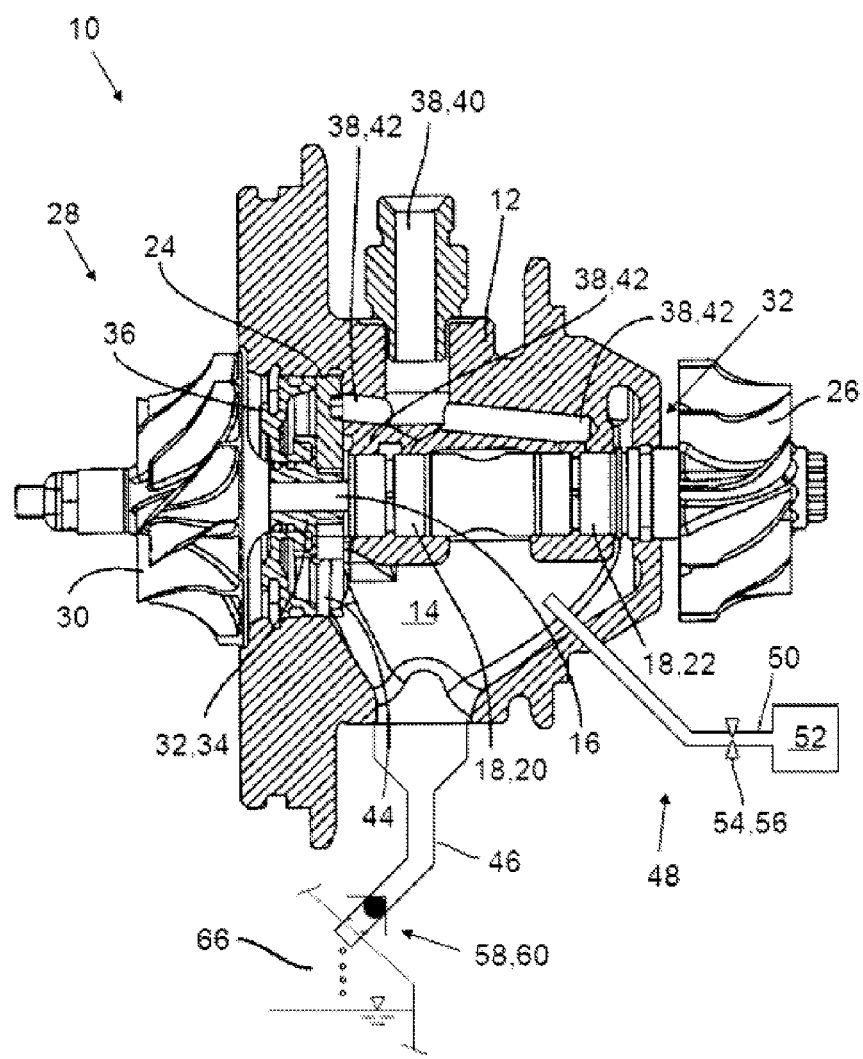
FIG. 1 shows a first example of a turbocharger arrangement.

A turbocharger arrangement for an internal combustion engine is described herein. The turbocharger arrangement may comprise a turbocharger housing which surrounds an inner space, a shaft which runs or extends through the turbocharger housing and on which at least one turbine wheel for driving a compressor unit is arranged. The turbocharger arrangement may further include a bearing arrangement mounting the shaft in the turbocharger housing, an oil supply device lubricating the bearing arrangement, and a sealing system sealing off the turbocharger housing with respect to the shaft.

The turbocharger arrangement discussed above reduces particle emissions from the engine when compared to prior turbocharger arrangements. A pressure changing unit included in the sealing system may be configured to adjust the pressure in the inner space, to reduce emissions. It will be appreciated that the pressure conditions acting upon the sealing system in the turbocharger arrangement may cause oil leakage from an enclosed area surrounding the shaft into the turbine or compressor wheel. Under some operating conditions, a low static pressure may prevail on the compressor side, whereas ambient pressure may prevail at or in the sealing systems or in the inner space. This pressure differential may be conducive to the compressor-side leakage of the oil. Therefore, the pressure in the inner space can be changed via the pressure changing unit may be configured to reduce the pressure differential to reduce oil leakage on the compressor side as well as the turbine side. Specifically, the pressure changing unit may reduce the pressure in the inner space so that the compressor-side pressure difference and consequently the tendency to oil leakage can be reduced. However, in other examples the pressure changing unit may increase the pressure in the inner space to reduce the pressure differential. Therefore, the pressure changing unit contributes to decreasing the particle emission of internal combustion engines, with the result that environmental pollution is reduced.

In one example, the pressure changing unit may have a vacuum line opening into the inner space and is coupled to a vacuum system. The vacuum system may enable air to be sucked out of the inner space via the vacuum line and consequently the pressure in the inner space can be lowered to an extent such that the pressure differences occurring during operation, in particular the compressor-side pressure differences acting upon the sealing system, can be reduced or even compensated completely. The vacuum line may in this case open into the inner space at any desired location and is connected to the vacuum system. Depending on the sealing system used, however, it may in this case be desirable if the vacuum line opens into the inner space in the immediate vicinity of the sealing system, in one example.

Additionally, it may be gathered from the above statements that a high pressure differential may arise during turbocharger operation, particularly on the compressor side, so it may be desirable to position the vacuum line output adjacent to the compressor-side part of the sealing system in the inner space.

A compressor system may also be used in the turbocharger system to increase the pressure in the inner space to reduce lubricant leaks.

In one example, a vacuum control valve for controlling the pressure in the inner space is arranged in the vacuum line. The vacuum control valve may be configured to variably adjust the pressure in the inner space based on turbocharger operating conditions. Thus, the pressure in the inner space may be controlled as a function of the rotational speed of the shaft or of other suitable operating parameters of the engine, in one example. Furthermore, regulation of the pressure is also possible, for which purpose a pressure sensor, through signals of which the vacuum control valve is activated, may be arranged in the inner space, in another example. Furthermore, a control loop with a processor unit may be provided, so that desired-value/actual-value balancing of the pressure in the inner space can be made possible, in another example. In this example, the pressure in the inner space may be variably adjusted based on one or more operating conditions (e.g., prevailing operating conditions) in order to reduce oil leakage.

The turbocharger arrangement may also comprise an oil outflow line communicating with the inner space and having a nonreturn valve. The nonreturn valve may be a check valve. As a result, the likelihood of an undesirable pressure compensation taking place via the oil outflow line with an oil sump which is usually approximately under atmospheric pressure, when the pressure in the inner space is reduced via the pressure changing unit may be reduced (e.g., prevented).

In another example, the nonreturn valve may have a predetermined leakage threshold pressure opposite to the blocking direction, in order to reduce the likelihood of the predetermined leakage threshold pressure (e.g., minimum pressure) in the inner space from being undershot. This may serve, for example, for protecting the sealing systems and other components of the turbocharger arrangement from under-pressure conditions.

Active pressure regulation may also be employed via a controllable bypass at the nonreturn valve, in some examples. In one example, such pressure regulation or control may take place alternatively or additionally to regulation or control via a control valve in the vacuum line, that is to say the last-mentioned control valve may, if appropriate, be dispensed for regulation in the region of the check valve.

Furthermore in some examples, the oil outflow line may be used not only for discharging the oil, but at the same time also for the evacuation of air out of the inner space. To that extent, this development is distinguished by structural compactness and a simplified design, thus lowering the production costs. In this case, the vacuum system may also be accommodated in or on the crankshaft housing and engage there into the oil outflow line. To that extent, the free space available for structural configuration is increased, since the placement of the vacuum system can be selected flexibly. Moreover, the place where and the way in which the vacuum system engages into the oil outflow line may be selected largely freely. It is thus possible to cause the vacuum line to engage into the oil outflow line at any desired point between the internal combustion engine and the turbocharger arrangement.

Particularly when the oil outflow line is also at the same time connected to (e.g., in fluidic communication with) the vacuum line, an oil collecting zone (or steadying zone) may be provided between the vacuum line and oil outflow line. Thus, the oil can be captured and the likelihood of oil being sucked into the vacuum system when the inner space is evacuated is reduced (e.g., inhibited). The oil collecting zone may be implemented by an additional volume. Depending on the actual oil flow conditions, however, a labyrinth arrangement or a filter may also be provided in order to reduce the likelihood of the penetration of oil splashes or of oil mist into the vacuum system.

It will be appreciated that the turbocharger arrangements discussed above may be used in an internal combustion engine and the benefits discussed above may be extended to the internal combustion engine.

FIG. 1 illustrates a side view of a first example of a turbocharger arrangement 10 for an internal combustion engine. The turbocharger arrangement 10 comprises a turbocharger housing 12 which surrounds an inner space 14. A shaft 16 runs or extends through the inner space 14 and is mounted in the inner space 14 by a bearing arrangement 18. In the example illustrated in FIG. 1, the bearing arrangement 18 includes a first plain bearing 20 and a second plain bearing 22 mounted to the shaft 16. Furthermore, the bearing arrangement 18 includes an axial bearing 24. Outside the turbocharger housing 12, a turbine wheel 26 may be arranged fixedly in terms of rotation on the shaft 16 and, during operation, is set in rotation by the exhaust gas stream of the internal combustion engine. On that side of the turbocharger housing 12 which may lies opposite the turbine wheel 26, a compressor unit 28 is provided, which comprises a compressor wheel 30. The compressor unit may be configured to feed charged air to the internal combustion engine and the compressor wheel may be configured to increase the pressure of the intake air flowing therethrough.

The inner space 14 is sealed off with respect to the shaft 16 via a sealing system 32, to reduce the likelihood of (e.g., prevent) oil escaping out of the inner space 14. The sealing system 32 comprises on the compressor side a pressure ring 34 which may be seated on the shaft 16 and may seal off the latter with respect to the turbocharger housing 12, and also an insert 36 for fixing purposes. The sealing system 32 may include a turbine wheel side seal configured to seal the shaft 16 with respect to the turbocharger housing 12.

To lubricate the bearing arrangement 18, an oil supply device 38 may be provided. The oil supply device may include an oil inlet 40, via which oil can be introduced into the inner space 14. The oil supply device 38 may have a plurality of distributor ducts 42, via which the oil is fed to the various bearings. The axial bearing 24 may also include an outlet 44, via which the oil can be discharged from the axial bearing 24 again. Moreover, an oil outflow line 46 is provided. The oil outflow line may be configured to remove oil from the inner space 14. The outflow line may be connected to (e.g., in fluidic communication with) an oil sump 66 which may be at the level of atmospheric pressure, in one example.

To change the pressure in the inner space 14, a pressure changing unit 48 may be provided. The pressure changing unit may include a vacuum line 50 which is in fluidic communication with the inner space 14. Furthermore, in the example illustrated, the pressure changing unit 48 includes a vacuum system 52. The vacuum system 52 may be configured to discharge air out of the inner space 14 via the vacuum line 50 and the pressure in the inner space 14 can thus be lowered. The vacuum may be obtained either from the intake system of the motor vehicle or through pumps or the like. To control the pressure in the inner space 14, a vacuum control valve 54 may be provided, which may be configured, for example, as a throttle 56. In order to reduce the likelihood of oil flowing from the oil outflow line 46 into the inner space 14 again on account of the reduced pressure in the latter, and undesirable pressure compensation thereby takes place, an oil flow control valve 58, which is implemented in the example illustrated as a nonreturn valve 60, may be arranged in the oil outflow line 46. The nonreturn valve also may be referred to as a check valve.

When the internal combustion engine is in operation, a pressure which is reduced in relation to the pressure in the inner space 14 may be formed particularly on the compressor side. With the aid of the pressure changing unit 48, the pressure in the inner space 14 can be reduced and the tendency to leakage thus decreased, this having a beneficial effect on the particle emission of the internal combustion engine.

Figure 2:
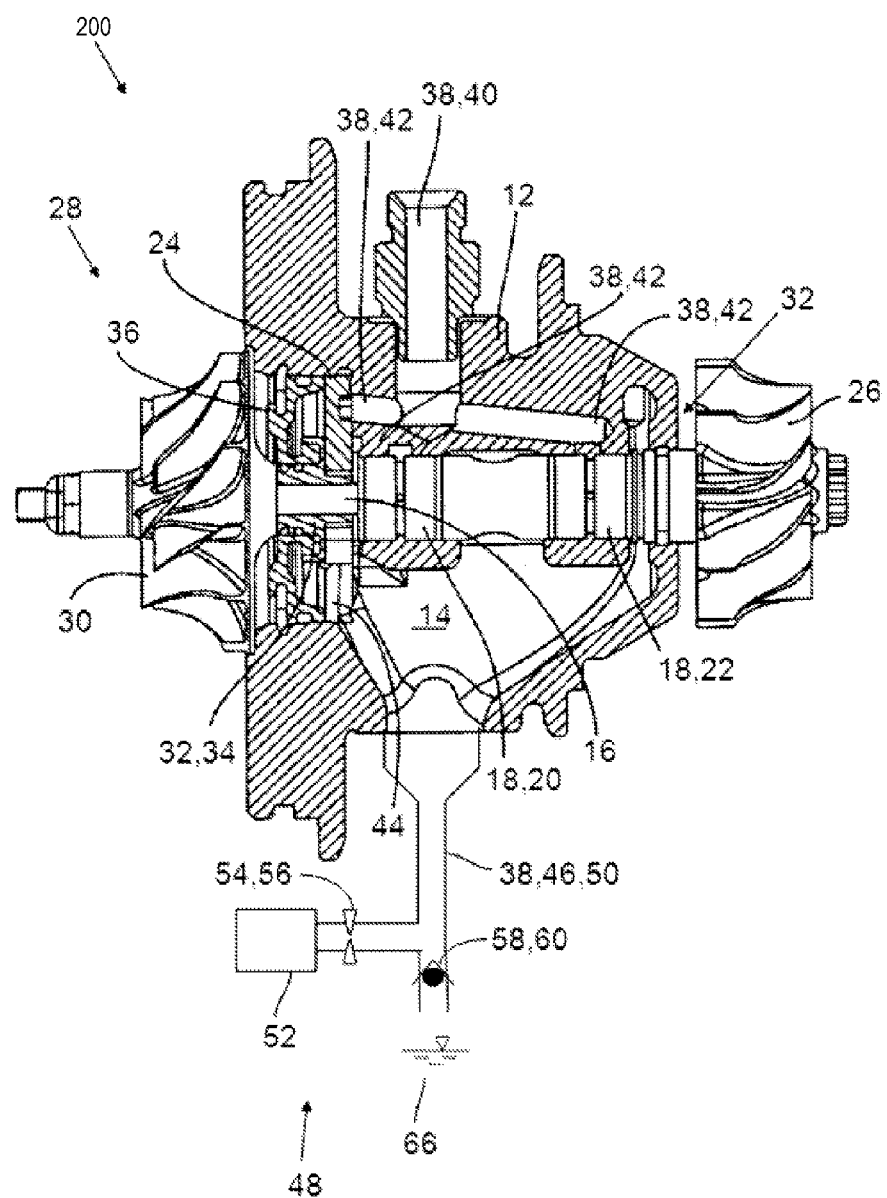
FIG. 2 shows a second example of the turbocharger arrangement.

FIG. 2 illustrates a second example of a turbocharger arrangement 200. The vacuum system 52 is in fluidic communication with the oil outflow line 46, so that a separate vacuum line 50 led to the turbocharger housing may not be used, if desired. Once again, the pressure in the inner space 14 may be changed by the pressure changing unit 48 which, in the example illustrated, is configured as the vacuum system 52. Furthermore, the vacuum control valve 54 designed as a throttle 56 is provided in order to control the pressure in the inner space 14. Moreover, an oil collecting zone may be provided, in which the discharged oil can collect so that it cannot enter the vacuum system 52. In order to reduce the likelihood of a situation where undesirable pressure compensation takes place via the oil outflow line 46, an oil flow control valve 58 designed as a nonreturn valve 60 (e.g., check valve) may be arranged in the oil outflow line 46.

FIGS. 1 and 2 provide for a turbocharger arrangement in an internal combustion engine including a turbocharger housing surrounding a sealed inner space, a shaft extending through the turbocharger housing, a turbine wheel arranged on the shaft and driving a compressor unit, a bearing arrangement mounting the shaft in the turbocharger housing, an oil supply device lubricating the bearing arrangement, and a pressure changing unit in fluidic communication with the sealed inner space configured to adjust the pressure in the sealed inner space based on engine operating conditions.

FIGS. 1 and 2 further provide for a turbocharger arrangement where the pressure changing unit is configured to decrease the pressure in the sealed inner space based on a turbocharger speed. FIGS. 1 and 2 further provide for a turbocharger arrangement where the pressure changing unit includes a vacuum system in fluidic communication with the sealed inner space.

FIGS. 1 and 2 further provide for a turbocharger arrangement where the pressure changing unit is coupled to an oil outflow line in fluidic communication with an oil sump. FIGS. 1 and 2 further provide for a turbocharger arrangement where the pressure changing unit is coupled to a vacuum line opening into the sealed inner space at a positioned spaced away from an inlet of an oil outflow line.

Figure 3:
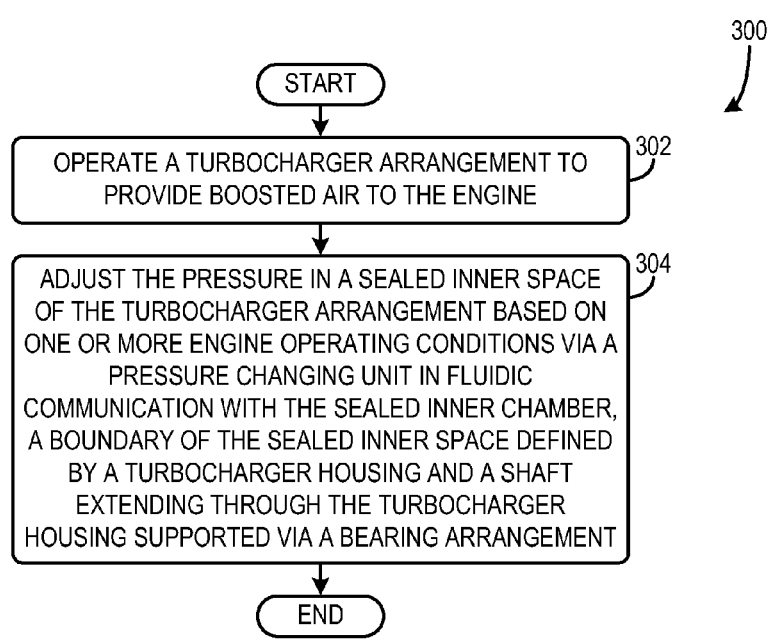
FIG. 3 shows a method for operation of a turbocharger arrangement.

FIG. 3 shows a method 300 for operation of a turbocharger arrangement. The method 300 may be implemented via the turbocharger arrangements discussed above with regard to FIGS. 1 and 2 or may be implemented via another suitable turbocharger arrangement.

At 302 the method includes operating a turbocharger arrangement to provide boosted air to the engine. Next at 304 the method includes adjusting the pressure in a sealed inner space of the turbocharger arrangement based on one or more engine operating conditions via a pressure changing unit in fluidic communication with the sealed inner chamber, a boundary of the sealed inner space defined by a turbocharger housing and a shaft extending through the turbocharger housing supported via a bearing arrangement.

In one example, adjusting the pressure in the sealed inner space includes decreasing and increasing the pressure in the sealed inner space. Further in one example, the engine operating conditions include turbocharger speed. Further in another example, the pressure changing unit is in fluidic communication with a vacuum source.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SYMBOLS 10, 200 Turbocharger arrangement
12 Turbocharger housing
14 Inner space
16 Shaft
18 Bearing arrangement
20 First plain bearing
22 Second plain bearing
24 Axial bearing
26 Turbine wheel
28 Compressor unit
30 Compressor wheel
32 Sealing system
34 Pressure ring
36 Insert
38 Oil supply device
40 Oil inlet
42 Distributor duct
44 Outlet
46 Oil outflow line
48 Pressure changing unit
50 Vacuum line
52 Vacuum system
54 Vacuum control valve
56 Throttle
58 Oil flow control valve
60 Nonreturn valve
66 Oil sump

The invention claimed is:

1. A method for operation of a turbocharger arrangement comprising:
   operating the turbocharger arrangement to provide boosted air to an engine; and
   adjusting pressure in a sealed inner space of the turbocharger arrangement based on turbocharger speed via a pressure changing unit comprising a vacuum line, the pressure changing unit in fluidic communication with the sealed inner space, a boundary of the sealed inner space being defined by a turbocharger housing and a shaft extending through the turbocharger housing supported via a bearing arrangement.

2. The method of claim 1, where adjusting the pressure in the sealed inner space includes decreasing and increasing the pressure in the sealed inner space.

3. The method of claim 1, where the pressure changing unit is in fluidic communication with a vacuum source.

4. A turbocharger arrangement in an engine, comprising:
   a turbocharger housing surrounding a sealed inner space;
   a shaft extending through the turbocharger housing;
   a turbine wheel arranged on the shaft and driving a compressor unit;
   a bearing mounting the shaft in the turbocharger housing;
   an oil inlet and a plurality of distributor ducts lubricating the bearing; and
   a pressure changing unit comprising a vacuum line, the pressure changing unit in fluidic communication with the sealed inner space to adjust pressure in the sealed inner space based on engine conditions, wherein the pressure changing unit is configured to decrease the pressure in the sealed inner space based on a turbocharger speed.

5. The turbocharger arrangement of claim 4, where the pressure changing unit further includes a vacuum source in fluidic communication with the sealed inner space.

6. The turbocharger arrangement of claim 4, where the pressure changing unit is coupled to an oil outflow line in fluidic communication with an oil sump.

7. The turbocharger arrangement of claim 4, where the pressure changing unit is coupled to a vacuum line opening into the sealed inner space at a position spaced away from an inlet of an oil outflow line.

8. A turbocharger arrangement for an internal combustion engine, comprising:
   a turbocharger housing surrounding an inner space;
   a shaft extending through the turbocharger housing;
   a turbine wheel arranged on the shaft and driving a compressor unit;
   a bearing arrangement mounting the shaft in the turbocharger housing;
   an oil inlet and a plurality of distributor ducts lubricating the bearing arrangement; and
   a seal sealing off the turbocharger housing with respect to the shaft including a pressure changing unit comprising a vacuum line, the pressure changing unit in fluidic communication with the inner space and configured to adjust pressure of the inner space, wherein the turbocharger arrangement has an oil outflow line in fluidic communication with the inner space and has a check valve counteracting pressure compensation between the inner space and an oil sump.

9. The turbocharger arrangement of claim 8, wherein the vacuum line opens into the inner space and which cooperates with a vacuum source.

10. The turbocharger arrangement of claim 9, wherein the pressure changing unit includes a vacuum control valve controlling the pressure in the inner space, wherein the vacuum control valve is arranged in the vacuum line.

11. The turbocharger arrangement of claim 9, wherein the vacuum line is in fluidic communication with the oil outflow line.

12. The turbocharger arrangement of claim 8, wherein the pressure changing unit is in fluidic communication with the oil outflow line.

13. The turbocharger arrangement of claim 9, wherein the vacuum line is in fluidic communication with the oil outflow line in a region of a crankshaft housing.

* * * * *